(12) United States Patent
Segalis et al.

(10) Patent No.: US 9,727,617 B1
(45) Date of Patent: Aug. 8, 2017

(54) SYSTEMS AND METHODS FOR SEARCHING QUOTES OF ENTITIES USING A DATABASE

(71) Applicant: Google Inc., Mountain View, CA (US)

(72) Inventors: Eyal Segalis, Tel Aviv (IL); Gal Chechik, Los Altos, CA (US); Yossi Matias, Tel Aviv (IL); Yaniv Leviathan, Savyon (IL); Yoav Tzur, Tel Aviv (IL)

(73) Assignee: GOOGLE INC., Mountain View, CA (US)

( * ) Notice: Subject to any disclaimer, the term of this patent is extended or adjusted under 35 U.S.C. 154(b) by 329 days.

(21) Appl. No.: 14/203,504

(22) Filed: Mar. 10, 2014

(51) Int. Cl.
*G06F 17/30* (2006.01)
*G06F 7/00* (2006.01)

(52) U.S. Cl.
CPC ................ *G06F 17/3053* (2013.01)

(58) Field of Classification Search
CPC ........ G06F 17/30864; G06F 17/30867; G06F 17/30595; G06F 17/30696; G06F 17/30991
USPC ...................................................... 707/722
See application file for complete search history.

(56) References Cited

U.S. PATENT DOCUMENTS

| | | | | |
|---|---|---|---|---|
| 2007/0233656 A1* | 10/2007 | Bunescu | ................ | G06F 17/278 |
| 2009/0282019 A1* | 11/2009 | Galitsky | ........... | G06F 17/30634 |
| 2012/0254188 A1* | 10/2012 | Koperski | .......... | G06F 17/30663 707/740 |
| 2014/0149110 A1* | 5/2014 | Liang | .................. | G06F 17/2775 704/9 |
| 2014/0280093 A1* | 9/2014 | Marantz | .............. | G06F 17/3097 707/723 |

* cited by examiner

*Primary Examiner* — Kuen Lu
(74) *Attorney, Agent, or Firm* — Middleton Reutlinger

(57) ABSTRACT

Systems and methods are provided for searching and identifying quotes in response to a query from a user. Consistent with certain embodiments, systems and methods are provided for identifying one or more subject entities associated with the query and for identifying, from a database or from search results obtained in response to the query, a set of quotes corresponding to the one or more subject entities. Further, systems and methods are provided for determining quote scores for the identified quotes based on at least one of the relationship of each quote to the one or more subject entities, the recency of each quote, and the popularity of each quote. Additionally, systems and methods are provided for organizing the identified quotes in a rank order based on the quote scores and selecting quotes based on the rank order or based on the quote scores. In addition, systems and methods are provided for transmitting information to display the selected quotes on a display device.

24 Claims, 8 Drawing Sheets

SYSTEMS AND METHODS FOR SEARCHING QUOTES OF ENTITIES USING A DATABASE

BACKGROUND

The proliferation of the Internet has enabled users to search for information conveniently, using a variety of electronics or communication devices. Such information may include, among other things, quotes from famous people, celebrities and/or others regarding a particular subject, such as a movie, television show, event, etc.

Currently, a number of websites allow users to submit textual searches to review and identify quotes. For example, several sites present quotes by famous people (e.g., quotes by Nelson Mandela). Some sites index quotes by general topics (e.g., 'Art' or 'Computers') and/or by the author or source of the quote (e.g., Winston Churchill). Other sites allow a textual (e.g., non-semantic) search for quotes containing specific words.

Such textual searches, however, often do not yield the results most desired by a user. For example, a search for the phrase "breaking bad" may return quotes like: "Most people don't have that willingness to break bad habits. They have a lot of excuses and they talk like victims." This quote, although real, does not relate to the popular television show "Breaking Bad." A user searching for quotes related to the television show "Breaking Bad," therefore, may receive quotes unrelated to the user's query.

SUMMARY

This disclosure presents computer-implemented systems and methods for searching for quotes of entities based on a user's query. As part of the search, one or more subject entities associated with the query may be identified. The present disclosure also relates to systems and methods that employ a database to identify a set of quotes corresponding to a query or one or more identified subject entities. Still further, systems and methods are provided for generating a rank order of the identified quotes, where the rank order is based on quote scores. In addition, systems and methods are provided for transmitting information to display the selected quotes on a display device.

In accordance with one exemplary embodiment, a computerized system for providing quotes is provided. The computerized system includes a memory device that stores a set of instructions and at least one processor that executes the set of instructions to receive a search query for a quote from a user, identify one or more subject entities associated with the query, and identify a set of quotes corresponding to the one or more subject entities. The at least one processor also executes the set of instructions to determine quote scores for the identified quotes based on at least one of the relationship of each quote to the one or more subject entities, the recency of each quote, and the popularity of each quote. In addition, the at least one processor is adapted to select quotes from the identified quotes based on the quote scores, and transmit information to a display device to display the selected quotes to the user.

In accordance with another exemplary embodiment, a method of providing quotes is provided, the method including operations performed by at least one processor. The operations of method include receiving a search query for a quote from a user, identifying one or more subject entities associated with the query, and identifying a set of quotes corresponding to the one or more subject entities. In addition, the operations of the method include determining quote scores for the identified quotes based on at least one of the relationship of each quote to the one or more subject entities, the recency of each quote, and the popularity of each quote. The operations of the method also include selecting quotes from the identified quotes based on quote scores, and transmitting information to a display device for displaying the selected quotes to the user.

In accordance with a still another exemplary embodiment, a computer program product is provided comprising executable instructions tangibly embodied in a non-transitory computer-readable medium. The instructions when executed by one or more processors, cause the one or more processors to receive a search query for a quote from a user, identify one or more subject entities associated with the query, and identifying a set of quotes corresponding to the one or more subject entities. The instructions also cause the one or more processors to determine quote scores for the identified quotes based on at least one of the relationship of each quote to the one or more subject entities, the recency of each quote, and the popularity of each quote. In addition, the instructions also cause the one or more processors to select quotes from the identified quotes based on the quote scores, and transmit information to a display device for displaying the selected quotes to the user.

In accordance with a further exemplary embodiment, a client is provided that comprises a memory device that stores a set of instructions and at least one processor that executes the set of instructions. The at least one processor executes the set of instructions to receive a query for quotes from a user, identify one or more subject entities associated with the query, and identify a set of quotes corresponding to the one or more subject entities. The at least one processor also executes the set of instructions to determine quote scores for the identified quotes based on at least one of the relationship of each quote to the one or more subject entities, the recency of each quote, and the popularity of each quote. In addition, the at least one processor executes the set of instructions to select quotes from the identified quotes based on the quote scores, and transmit information to display the selected quotes. The client device also includes a display device to receive the transmitted information and display the selected quotes to the user.

Before explaining exemplary embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which the disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

DETAILED DESCRIPTION OF EXEMPLARY EMBODIMENTS

Reference will now be made in detail to the present embodiments of the disclosure, certain examples of which are illustrated in the accompanying drawings.

This disclosure presents computer-implemented systems and methods for searching for quotes associated with a query. The query may be received from a user at a client device. In some embodiments, the systems and methods may evaluate the query to identify subject entities (e.g., persons, places, things, events, topics, etc.) relevant to the query. The systems and methods may identify one or more knowledge graph items associated with the subject entities to identify additional subject entities relevant to the query. As further disclosed herein, quotes corresponding to the identified subject entities may be retrieved from a database of quotes. Quote scores may be generated for each quote. The quote scores may be based on one or more of, for example, relevance of the quote to the query, recency of the quote, or popularity of the quote.

Consistent with embodiments of the present disclosure, the identified quotes may be ranked in an ascending or descending rank order based on the quote scores. One or more quotes from the rank ordered quotes can be selected for display on a display device. Embodiments of the present disclosure also encompass systems and methods for providing graphical user interfaces for presenting or displaying the selected quotes to a user.

Figure 1:
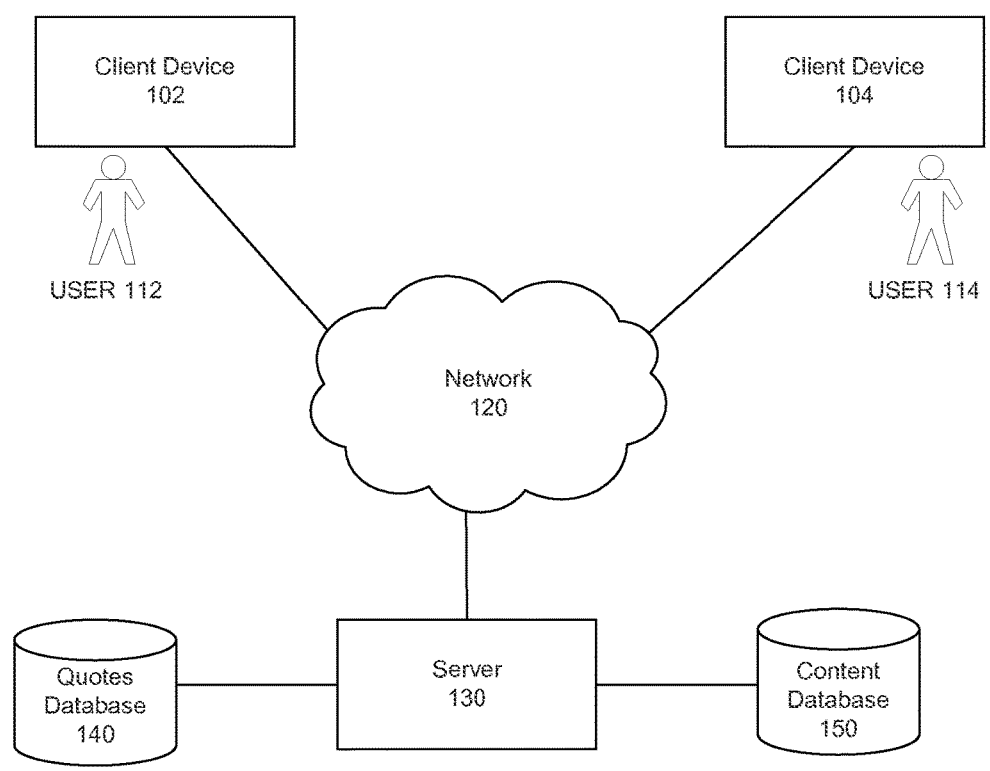
FIG. 1 illustrates an exemplary system environment for implementing embodiments and features of the present disclosure.

FIG. 1 is a block diagram of an exemplary system 100 for implementing embodiments and features of the present disclosure. The arrangement and number of components in system 100 is provided for purposes of illustration. Additional arrangements, number of components, and other modifications may be made, consistent with the present disclosure.

As shown in FIG. 1, system 100 may include one or more client devices 102, 104 that are owned or operated by one or more users 112, 114. By way of example, client devices 102, 104 may include smartphones, tablets, netbooks, electronic readers, personal digital assistants (PDAs), web enabled television sets, personal computers, laptop computers, desktop computers, and/or other types of electronics or communication devices. In certain embodiments, client devices 102, 104 may be implemented with hardware devices and/or software applications running thereon. In other embodiments, client devices 102, 104 may implement the disclosed embodiments and features without the need for accessing another device, component, or network, such as network 120. In some embodiments, server 130 may implement the disclosed embodiments and features without the need for accessing another device, component, or network 120. In yet other embodiments, client devices 102, 104 may be configured to communicate to and/or through network 120 with other clients and components, such as server 130, quotes database 140, and/or content database 140.

In certain embodiments, network 120 may include any combination of communications networks. For example, network 120 may include the Internet and/or any type of wide area network (WAN), an intranet, a metropolitan area network, a local area network (LAN), a wireless network, a cellular communications network, etc. In some embodiments, client devices 102, 104 may be configured to transmit requests (e.g., a query for quotes related to a particular subject based on input provided by users 112, 114) through network 120 to an appropriate server, such as, for example, server 130. In some embodiments, client devices 102, 104 may also be configured to receive information (e.g., quotes), in response to requests, from server 130 through network 120.

Server 130 may include one or more servers configured to communicate and interact with client devices 102, 104, network 120, quotes database 140, and/or content database 150. In some embodiments, server 130 may implement or provide one or more search engines, quotes aggregation and classification engines, quote ranking engines, and/or applications or programs to create and/or modify knowledge graph items and aggregate and classify quotes for content. In one exemplary embodiment, server 130 may be a special purpose computer configured to implement the embodiments of this disclosure. In another exemplary embodiment, server 130 may be a general purpose computer, a mainframe computer, or any combination of these components. In certain embodiments, server 130 may be a standalone computing system or apparatus, or it may be part of a subsystem, which may be part of a larger system. For example, server 130 may represent remotely located and distributed servers that may communicate over a communications medium (e.g., network 120) or over a dedicated network, for example, a LAN or a WAN. In some embodiments, server 130 may be implemented as an independent computing device, a server system comprising a plurality of servers, or a server farm comprising a load balancing system and a plurality of servers.

Quotes database 140 may include one or more logically and/or physically separate databases configured to store data. The data stored in quotes database 140 may be received from servers 140, from client devices 102, 104 and/or may be provided as input using conventional methods (e.g., data entry, data transfer, data uploading, etc.). The data stored in the quotes database 140 may take or represent various forms including, but not limited to, documents, presentations, textual content, audio files, video files, and a variety of other electronic data, or any combination thereof. Quotes database 140 may also store, for example, quotes, authors of quotes, subject entities associated with the quotes, and/or a corpus of content items, etc. The corpus of content items may include documents, presentations, news items, articles, blog posts, books, book reviews, magazines, magazine articles, audio or video recordings, text messages, e-mail messages, social media content, or any other type of information item known in the art. In certain embodiments, the corpus of content items may be a personalized corpus of content items, personalized for a user 112, 114 using system 100. A personalized corpus of content items may include documents, presentations, news items, articles, blog posts, books, book reviews, magazines, magazine articles, audio or video recordings, text messages, e-mail messages, social media content, or any other type of information authored by a user and/or the user's social media contacts or by preferred contacts identified by the user. The personalized corpus of content items may also include search logs containing search strings used by the user to search for content items and/or quotes.

In some embodiments, quotes database 140 may be implemented using a single computer-readable storage medium. In other embodiments, quotes database 140 may be maintained in a network attached storage device, in a storage area network, or combinations thereof, etc. Furthermore, quotes database 140 may be maintained and queried using numerous types of database software and programming languages, for example, SQL, MySQL, IBM DB2®, Microsoft Access®, PERL, C/C++, Java®, etc. Although FIG. 1 shows quotes database 140 associated with server 130, quotes database 140 may be a standalone database that may be accessible via network 120 or quotes database 140 may be associated with or provided as part of a system 100 or environment that may be accessible to client devices 102, 104 and/or other components.

Content database 150 may have a structure and function similar to quotes database 140 and may be maintained and queried in a manner similar to quotes database 140. In certain embodiments, content database 150 may store the corpus of content items and/or the personalized corpus of content items. In other embodiments, content database 150 may also include information regarding authors of quotes, and other content items related to various quotes. In certain embodiments, system 100 may include only quotes database 140, which may perform functions of both quotes database 140 and content database 150. In other embodiments, system 100 may include only content database 150, which may perform functions of both quotes database 140 and content database 150. In yet other embodiments, as illustrated in FIG. 1, system 100 may include both quotes database 140 and content database 150. Although FIG. 1 illustrates only one quotes database 140 and only one content database 150, system 100 may include any number of quotes databases 140, content databases 150, and/or any other databases.

Figure 2:
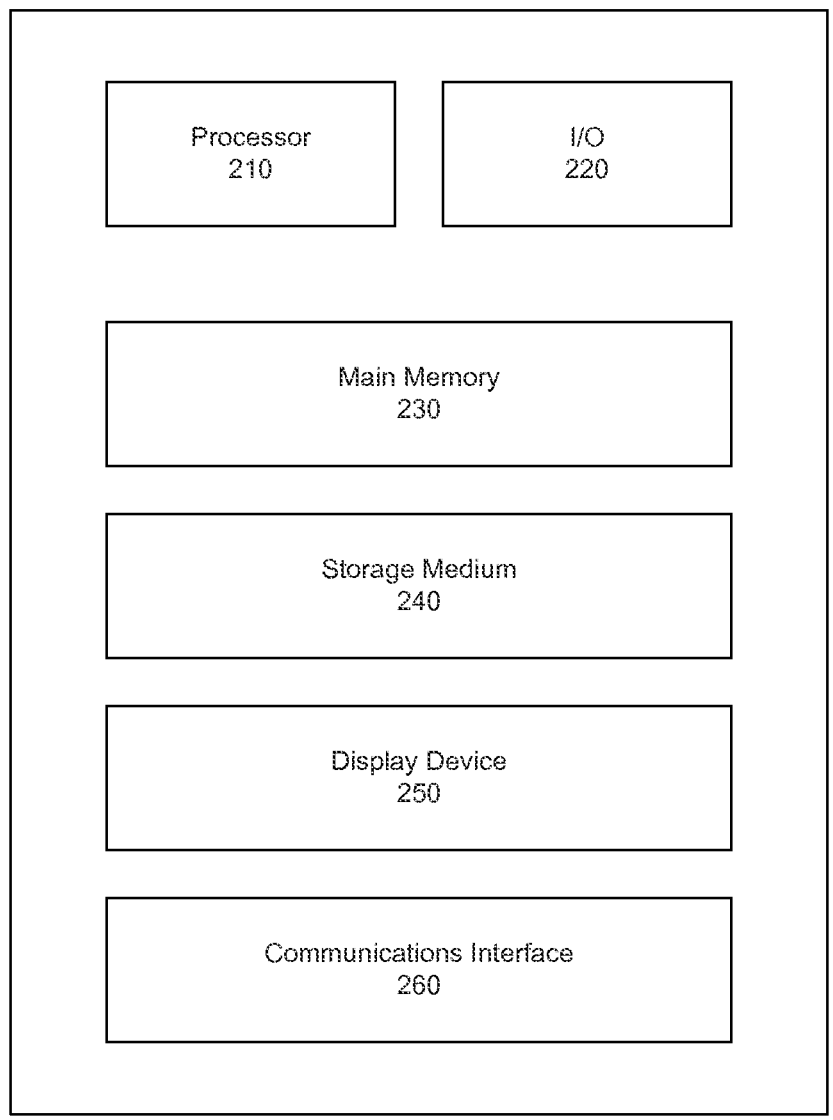
FIG. 2 illustrates an exemplary electronic apparatus or system for implementing embodiments and features of the present disclosure.

FIG. 2 is a block diagram of an exemplary electronic apparatus or system 200 for implementing embodiments and features of the present disclosure. By way of example, apparatus or system 200 may be used to implement client devices 102, 104 and/or server 130 of FIG. 1. The arrangement and number of components in system 200 is provided for purposes of illustration. Additional arrangements, number of components, and other modifications may be made, consistent with the present disclosure.

As shown in FIG. 2, system 200 may include one or more processors 210 for executing instructions. The one or more processors 210 may be single-core or multi-core processors based on the RISC, CISC, or any other computer instruction architecture known in the art. In some embodiments, the one or more processors 210 may include one or more graphics or other digital signal processors. System 200 may also include one or more input/output (I/O) devices 220. By way of example, I/O devices 220 may include physical keyboards, virtual touch-screen keyboards, mice, joysticks, styluses, etc. In certain embodiments, system 200 may also be capable of receiving input through gestures made by a user and/or a microphone (not shown) using, for example, speech-to-text and/or voice recognition applications.

As further illustrated in FIG. 2, system 200 may include one or more storage devices 230, 240 configured to store data and/or software instructions used by the one or more processors 210 to perform operations consistent with disclosed embodiments. For example, system 200 may include main memory 230 configured to store one or more software programs that performs functions or operations when executed by the one or more processors 210. By way of example, main memory 230 may include NOR or NAND flash memory devices, Read Only Memory (ROM) devices, Random Access Memory (RAM) devices, etc. System 200 may also include storage medium 240. By way of example, storage medium 240 may include hard drives, compact discs, blue ray discs, digital video discs, solid state drives, tape drives, RAID arrays, etc. Although FIG. 2 shows only one main memory 230 and one storage medium 240, system 200 may include any number of main memories 230 and storage mediums 240. Further, although FIG. 2 shows main memory 230 and storage medium 240 as part of system 200, main memory 230 and/or storage medium 240 may be located remotely and system 200 may be able to access main memory 230 and/or storage medium 240 via network 120.

System 200 may also include one or more display devices 250 for displaying data and graphical user interfaces. Display devices 250 may be implemented using devices or technology, such as a cathode ray tube (CRT) display, a liquid crystal display (LCD), a plasma display, a light emitting diode (LED) display, a touch screen type display, and/or any other type of display known in the art.

System 200 may also include one or more communications interfaces 260. Communications interface 260 may allow software and data to be transferred between system 200, network 120, client devices 102, 104, server 130, and/or other components. Examples of communications interface 260 may include a modem, a network interface (e.g., an Ethernet card), a communications port, a PCMCIA slot and card, etc. Communications interface 260 may transfer software and data in the form of signals, which may be electronic, electromagnetic, optical, or other signals capable of being received by communications interface 260. These signals may be provided to communications interface 260 via a communications path (not shown), which may be implemented using wire, cable, fiber optics, radio frequency ("RF") link, and/or other communications channels.

The disclosed embodiments are not limited to separate programs or computers configured to perform dedicated tasks. For example, server 130 may include main memory 230 that stores a single program or multiple programs. Additionally, server 130 may execute one or more programs located remotely from server 130. For example, server 130 may access one or more remote programs stored in main memory 230 included within a component, for example, client devices 102, 104 that, when executed, perform operations consistent with the disclosed embodiments. In some exemplary embodiments, server 130 may be capable of accessing separate web server(s) or computing devices that generate, maintain, and provide web site(s), dictionary services, and/or translation services. Client devices 102, 104 may function in a manner similar to server 130 and vice-versa.

Figure 3:
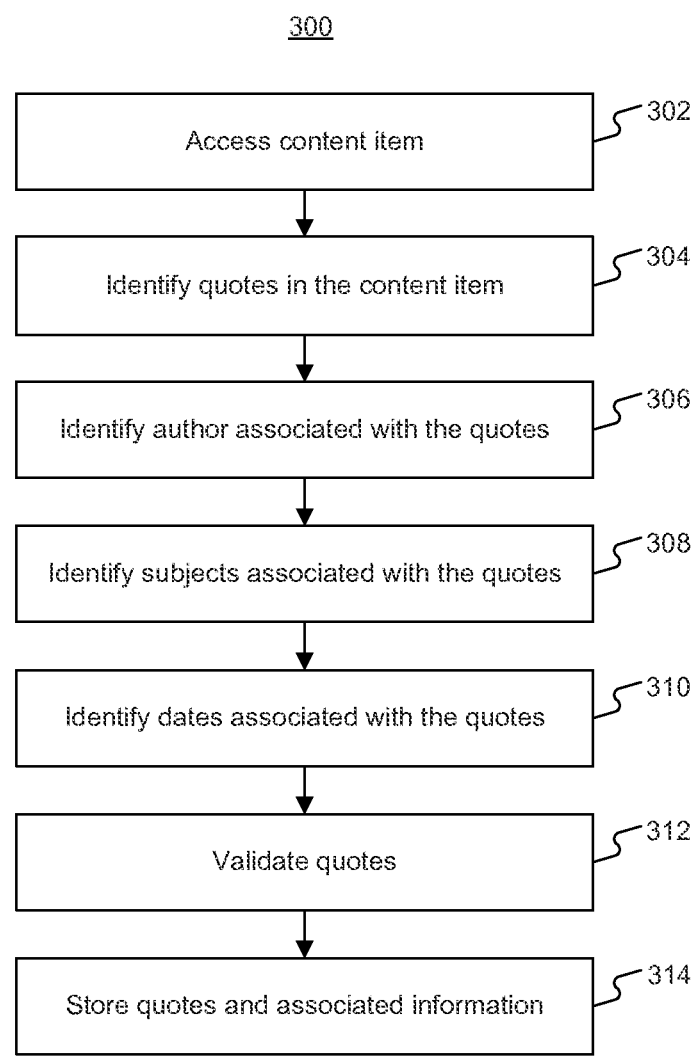
FIG. 3 is a flowchart of an exemplary process for collecting and storing quotes.

FIG. 3 is a flowchart of an exemplary process 300 that may be implemented for identifying and storing quotes and information associated with the quotes. Process 300 may be implemented with one or more processors. In certain embodiments, process 300 may be implemented on server 130 without the need to access client devices 102, 104 and/or network 120. In other embodiments, process 300 may be implemented on client devices 102, 104 without the need to access server 130 and/or network 120. In further embodiments, process 300 may be implemented using one or more of client devices 102, 104, and/or server 130 communicating via network 120. The order and arrangement of steps in process 300 is provided for purposes of illustration. As will be appreciated from this disclosure, modifications may be made to process 300 by, for example, adding, combining, removing, and/or rearranging the steps for the process.

A quote may include a single word, a phrase, a statement, and/or an inflected form, spoken, written or expressed in some form by an author or entity. By way of example, a single word, such as, "eureka," "believe," "dare," or "action" may represent a quote. Further, by way of example, a sentence or phrase such as "the cautious seldom err," or "hope is a waking dream" may represent a quote. Quotes may also include a paragraph or collection of sentences or phrases. An author may include a person, group, or an organization. By way of example, a person, such as, President Obama may be an author of a quote. Further by way of example, the United Nations, which is an organization, may be an author of a quote.

As shown in FIG. 3, process 300 may include a step 302 of accessing a content item from a corpus of content items. Accessing a content item in step 302 may include accessing or receiving a content item from a corpus of content items stored in content database 150, quotes database 140, or in another database associated with system 100. In one exemplary embodiment, accessing a content item may include retrieving a content item from a corpus of content items stored in main memory 230 or storage medium 240 of client devices 102, 104, and/or server 130. In another exemplary embodiment, accessing a content item may include receiving the content item when a user 112, 114 inputs the content item using one or more of the I/O devices 220 associated with one or more client devices 102, 104 and/or with server 130. In some exemplary embodiments, a content item may be received in step 302 in the form of a Uniform Resource Locator ("URL") or other identifier, which can specify, e.g., a web page, a document, an image, or other resource. In other exemplary embodiments, the content item may be accessed from a personalized corpus of content items using any of the methods described above.

As further shown in FIG. 3, process 300 may include a step 304 of identifying one or more quotes in the content item. Identifying quotes in step 304 may include searching textual content in the content item. Additionally or alternatively, identifying quotes in step 304 may include performing audio or video analysis on the content item. In some embodiments, identifying quotes may include identifying textual or other signals, which may indicate the presence of a quote. By way of example, the word "said" may often precede a quote. For example, the content item may include text such as "President Obama said" followed by a phrase or sentence in quotation marks. The word, phrase, or sentence following the word said may be identified as a quote. In some embodiments, the presence of quotation marks may be used to identify one or more quotes in the content item. Other textual symbols may be used to identify quotes. For example, quotes may appear in the content item as an author of the quote followed by a punctuation mark, such as, a colon, followed by the word, phrase or sentence that may be identified as a quote.

Process 300 may also include a step 306 of identifying an author of a quote. Identifying an author in step 306 may include determining a name or an identifier of a person, group, organization, etc., who may have written, spoken, or expressed the quote identified, for example, in step 304. In some embodiments, textual signals may be used to perform this task. By way of example, the text preceding the word "said" may be indicative of the author of a particular quote. For example, in the sentence: President Obama said, "The absence of hope can rot a society from within," the words preceding "said" indicate that the quote was spoken by the author, President Obama. In other embodiments, an author associated with a quote may be determined by recognizing the speaker of an audio content. For example, everything said by a speaker could be identified as a quote made by that speaker. There may be other ways to determine an author associated with a quote. For example, the title of the content item or the source of the content item containing the quote may indicate the author associated with a quote. By way of example, a quote from a book may be associated with an author of the book. Further, by way of another example, person A may be identified as an author of a quote extracted from a content item including the text of a speech by person A. Based on this disclosure, one of ordinary skill in the art will recognize that quotes identified in content items selected from a personalized corpus of content items may include quotes made by the user or by social media contacts of the user.

As shown in FIG. 3, process 300 may also include a step 308 of identifying subject entities associated with each quote. By way of example, one or more words or phrases may be extracted from each quote and compared to words and/or phrases in a subject entity database to determine the subject entities. For example, in the quote: "Education is the most powerful weapon which you can use to change the world," words like "education" and "change," may indicate the subject entities that may be associated with the quote. In some embodiments, the subject entity database may be a separate database associated with system 100. In other embodiments, subject entity database may be included in quotes database 140 and/or content database 150.

Process 300 may also include a step 310 of identifying a date associated with a quote. The date may represent a date on which the quote was first written, spoken, and/or expressed by an author of the quote. In certain embodiments, the date may represent a date on which the quote was first published in a content item from a corpus of content items. In other embodiments, the date, in step 310, may be identified based on information in the content item indicating the date. For example, a news article may report the date of a speech made by President Obama, indicating the date associated with a quote from that speech.

Process 300 may also include a step 312 of validating quotes. Quotes may be validated in many ways. In some embodiments, a quote may be validated by determining whether the exact quote appears in more than one content item in a corpus of content items. In other embodiments, a quote may be deemed valid, when it appears in more than one content item from different authors, publishers, web, and/or media outlets, etc. In other embodiments, a quote may be validated if the exact quote appears in a content item containing a transcript including the quote. In yet other embodiments, a quote may be validated by confirming the accuracy of the quote with an author of the quote.

Process 300 may also include a step 314 of storing the quotes and the associated information. Associated information for a quote may include the author associated with the quote, as determined, for example, in step 306, one or more subject entities associated with the quote, as determined, for example, in step 308, and/or a date associated with the quote, as determined, for example, in step 310. Associated information may also include some or part of the content item that included the quote, a summary of the content item that included the quote, other content items related to the content item that included the quote, and/or links, URLs, or other references to content items or resources related to the quote or to subject entities associated with the quote. In some embodiments, the quote and the associated information may be stored in quotes database 140. In other embodiments, the quote and the associated information may be stored in content database 150 or any other database associated with system 100. A quote and its associated information may be stored in association with each other in quotes database 140, content database 150, or any other database associated with system 100. In some embodiments the quote and its associated information may be stored in separate databases associated with system 100 and an association table may be used to link each quote to its associated information.

In some embodiments quotes obtained from content items in a user's personalized corpus of content items may be marked to indicate that the quotes may be personal to the user (e.g., quotes made by the user or the user's social media contacts). The quotes may be marked using a flag, an indicator, or any other type of marker known in the art. In embodiments which use a personalized corpus of content items, users may be provided with an opportunity to control whether the disclosed systems or methods collect user information (e.g., information about a user's social network, social actions or activities, profession, a user's preferences, or a user's current location), or to control whether and/or how to receive quotes that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the disclosed systems and methods.

Figure 4:
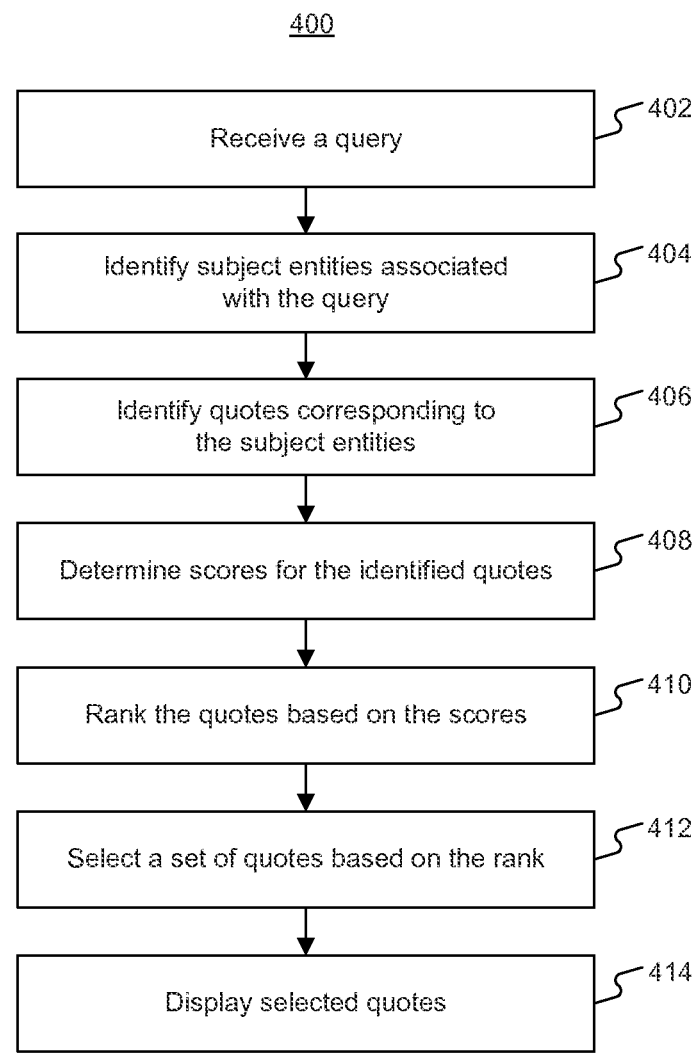
FIG. 4 is a flowchart of an exemplary process for providing quotes in response to a query.

FIG. 4 is a flowchart of an exemplary process 400, consistent with embodiments of the present disclosure. As further described below, the exemplary process 400 of FIG. 4 may be implemented for searching for and displaying quotes in response to a query. Process 400 may be implemented with one or more processors. In certain embodiments, process 400 may be implemented on server 130 without the need to access client devices 102, 104 and/or network 120. In other embodiments, process 400 may be implemented on client devices 102, 104 without the need to access server 130 and/or network 120. In further embodiments, process 400 may be implemented using one or more of client devices 102, 104, and/or server 130 communicating via network 120. The order and arrangement of steps in process 400 is provided for purposes of illustration. As will be appreciated from this disclosure, modifications may be made to process 400 by, for example, adding, combining, removing, and/or rearranging the steps for the process.

As shown in FIG. 4, process 400 may include a step 402 of receiving a query for a quote. In some embodiments, client device 102, 104 may receive the query from a user 112, 114 of client device 102, 104. A user may input the query into client device 102, 104, using one or more I/O devices 220 associated with client device 102, 104. In other embodiments, client device 102, 104 may receive the query from server 130 or vice-versa. Receiving a query, in step 402 of process 400, may include processes similar to those described above with respect to step 302 of process 300.

A query may take many different forms. In some embodiments, a query may identify both the author and subject entity associated with a quote. By way of example, such a query may include text such as "what did X say about Y?" The words "say about" may be used to identify an author and a subject from the query. For example, the query "what did X say about Y?" indicates X as the author of the quote and Y as the subject entity associated with the quote. By way of another example, the query: "What did President Obama say about Nelson Mandela" indicates that the query requests one or more quotes by the author of the quotes, President Obama, regarding the subject entity, Nelson Mandela.

In other embodiments, a query may identify only the subject entity associated with the requested quote. By way of example, such a query may include text such as "Tesla Motors," indicating Tesla Motors as the subject entity of a requested quote. In some embodiments, the query may include the word "quotes." For example, the query: "Breaking Bad quotes" may indicate that the query requests quotes associated with the subject entity "Breaking Bad." Based on this disclosure, one of ordinary skill in the art will recognize that a query of this type is not limited to a particular author of quotes but rather requests quotes from any author regarding the particular subject entity, for example, "Breaking Bad."

Process 400 may also include a step 404 of identifying subject entities associated with the query. Subject entities may include, for example, an author, a person, a place, a topic, an item or thing, and/or an event, etc. associated with the query. For example, the query "Mandela quotes" may include the subject entity "Mandela," who is a person. By way of another example, "Komen 10K quotes" may include the subject entity "Komen 10K," which may refer to a 10K charity event organized by the Susan G. Komen foundation.

Subject entities may be identified from a query in many ways. By way of example, the structure of the query itself may be used to determine the subjects associated with the query. For example, a query of the type "what did X say about Y" may be parsed to identify the subjects X and Y separated by the words "say about." In other embodiments, words or phrases may be extracted from the query. The extracted words or phrases may be compared to subject entities in a subject entity database to identify the subject associated with a query. For example, a query such as "Breaking Bad quotes" may provide the words "breaking," "bad," and the phrase "breaking bad." These extracted words and/or phrases may be compared to words or phrases stored in the subject entity database.

When more than one subject entity in the subject entity database matches the extracted words and/or phrases, relevance scores associated with the subject entities may be used to select one or more subject entities. The relevance score corresponding to each subject entity may be retrieved from the subject database. The relevance scores may indicate the degree of relevance of a particular subject entity. Relevance scores for a subject entity may be determined in many ways. In some embodiments, relevance scores for a subject entity may be based on a popularity of a subject entity in a corpus of content items. In other embodiments, relevance scores for a subject entity may be based on a popularity of the subject entity in search terms used by users 112, 114 when searching for information on the internet or web. In some embodiments, relevance scores may be based on a popularity of a subject entity during a particular time period. In certain embodiments, popularity of a subject entity may be determined based on a frequency of occurrence of the subject entity in a corpus of content items, in search terms used by users 112, 114, in web pages, etc. For example, the relevance scores for the subject entity "breaking bad" may be based on content items published between the time of release of the first episode of the television show "Breaking Bad" to one year after the release of the last episode. One or more subject entities corresponding to the highest relevance scores may be identified as subject entities corresponding to the query. By way of example, the relevance score of the subject entity "breaking bad" may be higher than the corresponding relevance scores of the words "breaking" and "bad" because the television show "Breaking Bad" may be very popular and the phrase "breaking bad" may occur very frequently in the corpus of content items or in the search terms of users.

In some embodiments, additional subject entities may be associated with the query. For example, the subject entity "television show" may be associated as an additional subject entity with the query "breaking bad quotes." Additional subject entities may be identified in many ways, some of which will be subsequently described in this disclosure with reference to process 500.

Process 400 may also include a step 406 of identifying quotes corresponding to the subject entities. Identifying quotes in step 406 may include searching for quotes associated with each identified subject entity from quotes stored in quotes database 140. In some embodiments, results obtained from a search for quotes related to one subject entity may be further narrowed using a second subject entity. For example, quotes retrieved from quotes database 140 regarding the subject entity "breaking bad" may be narrowed by further selecting quotes associated with the subject entity "television show." In some exemplary embodiments, a user may have an option to limit the quotes search to quotes obtained from a personalized corpus of content items, for example, when a user desires to know what his social media contacts may have said about a certain topic. In these exemplary embodiments, only quotes marked as personal to the user as discussed above, for example, may be selected for further processing. Although the above description describes identification of quotes from quotes database 140, quotes may be identified in step 406 from search results obtained in response to a query without accessing quotes database 140.

Process 400 may also include a step 408 of determining quote scores for the quotes identified, for example, in step 406. Quote scores may be determined in step 408 based on many factors. For example, a quote score may be based on the relevance of the quote to the query and/or recency. By way of example, a quote regarding electric motors by Nicola Tesla may be less relevant than a quote made by Elon Musk the founder of "Tesla Motors" for a query on quotes regarding "Tesla Motors." In some embodiments, the score for a quote may be based on the date of the quote. Taking the same example as before, a quote by Elon Musk regarding "Tesla Motors" may receive a higher score because it may be more recent compared to a quote by the historical figure "Nicola Tesla." In other embodiments, the score for a quote may depend on the popularity of the quote in a corpus of content items. Popularity of a quote may be determined in a manner similar to determining the popularity of a subject entity discussed above with respect to step 404. Additional ways of determining quote scores will be described subsequently in this disclosure with reference to process 600.

As shown in FIG. 4, process 400 may also include a step 410 of ranking the quotes in a rank order based on quote scores determined, for example, in step 408. In some embodiments, the quotes may be ranked in a descending order of quote scores so that the quotes having relatively higher quote scores have a higher rank compared to the quotes having relatively lower quote scores. In other embodiments, the quotes may be ranked in an ascending order of quote scores so that quotes having relatively lower quote scores have a higher rank compared to quotes having relatively higher quote scores.

Process 400 may also include a step 412 of selecting one or more quotes based on their rank. For example, in some embodiments, only the quote having the highest rank may be selected. In other embodiments, a certain number of quotes having the top few ranks in the rank order may be selected. By way of example, quotes corresponding to the highest three or five ranks in the rank order may be selected. Process 400 may also include a step 414 of displaying the quotes on a display device.

Figure 5:
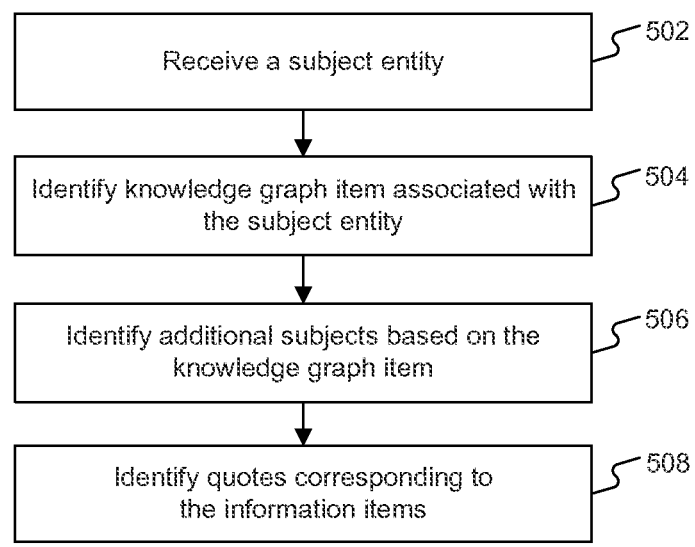
FIG. 5 is a flowchart of an exemplary process for identifying additional subject entities relevant to a query using a knowledge graph item.

FIG. 5 is a flowchart of an exemplary process 500, consistent with embodiments of the present disclosure. As further described below, the exemplary process 500 of FIG. 5 may be implemented for identifying additional subject entities related to a query based on a knowledge graph item. Process 500 may be implemented with one or more processors. In certain embodiments, process 500 may be implemented on server 130 without the need to access client devices 102, 104 and/or network 120. In other embodiments, process 500 may be implemented on client devices 102, 104 without the need to access server 130 and/or network 120. In further embodiments, process 500 may be implemented using one or more of client devices 102, 104, and/or server 130 communicating via network 120. The order and arrangement of steps in process 500 is provided for purposes of illustration. As will be appreciated from this disclosure, modifications may be made to process 500 by, for example, adding, combining, removing, and/or rearranging the steps for the process.

As shown in FIG. 5, process 500 may include a step 502 of receiving a subject entity. In some embodiments, client device 102, 104 may receive the subject entity by performing processes as discussed above, for example, with respect to step 404 of process 400. Additionally or alternatively, subject entities identified by client devices 102, 104 may be received by server 130 or vice versa. In other embodiments client devices 102, 104 or server 130 may store subject entities in main memory 230, storage device 240, quotes database 140, content database 150, and/or any other database associated with system 100. Receiving a subject entity may involve accessing the subject entity from main memory 230, storage device 240, quotes database 140, content database 150, and/or any other database associated with system 100. Receiving a subject entity in step 502 of process 500 may additionally or alternatively include processes similar to those described above with respect to, for example, step 302 of process 300.

Process 500 may also include a step 504 of identifying one or more knowledge graph items associated with the received subject entity. A knowledge graph item for a subject entity may include a corpus of information and content items associated with the subject entity. A corpus of information may include names, places, things, events, and/or content items. In some embodiments, the knowledge graph item may include links (for example, URL's) to the corpus of information. In other embodiments, the knowledge graph item may include references or links to other knowledge graph items and/or databases containing the corpus of information. By way of example, a knowledge graph item for the subject entity "Breaking Bad" may include a corpus of information including the names of the actors who acted in the television show "Breaking Bad," producers, directors, cinematographers, etc. associated with the television show, information about first release date, number of episodes, number of seasons, and/or duration of the television show, awards received by the television show or by the actors in the television show, summaries of episodes, blog posts, critics reviews, user reviews, news articles, magazine articles, speeches, books, or other content items associated with the television show "Breaking Bad," etc. By way of another example, the knowledge graph item may include additional information such as the frequency with which users 112, 114 may have searched for information or posted comments regarding the television series "Breaking Bad," or the popularity of the name of the show, "Breaking Bad" in a corpus of content items. Based on this disclosure, one of ordinary skill in the art will recognize that these are only examples and many other types of content items, including audio and video information, associated with a subject entity may be included in the knowledge graph item.

Identifying a knowledge graph item may include clients 102, 104 accessing a knowledge graph item database storing subject entities in association with knowledge graph items. In certain embodiments, the knowledge graph item database may be stored in main memory 230, storage device 240 associated with client devices 102, 104 or server 103. In other embodiments the knowledge graph item database may be stored in quotes database 140, content database 150, and/or any other database associated with system 100. Identifying the knowledge graph item may include searching for and accessing the knowledge graph item stored in association with the subject entity from main memory 230, storage device 240, quotes database 140, content database 150, and/or any other database associated with system 100. Identifying the knowledge graph item in step 504 of process 500 may additionally or alternatively include processes similar to those described above with respect to, for example, step 302 of process 300.

Process 500 may also include a step 506 of identifying additional subject entities based on the knowledge graph item. Identifying additional subject entities may include searching for subject entities within the corpus of information included in the knowledge graph item. In certain embodiments, identifying additional subject entities in step 506 of process 500 may include processes similar to those discussed with respect to step 404 of process 400. By way of example, the names of each of the actors, producers, directors, etc. of the television series "Breaking Bad," obtained from the associated knowledge graph item, may constitute additional subject entities. By way of another example, names of events like award shows where the television show was mentioned and/or the names of celebrities who attended the award show, etc. may also constitute additional subject entities. In certain embodiments, identification of additional subject entities may include a recursive process. For example, after obtaining names of events where the television show was mentioned, knowledge graph items associated with the events may be searched to identify speakers, presenters, or other people associated with those events as subject entities. One or more additional subject entities may be selected from among the identified additional subject entities using relevance scores based on processes similar to those discussed with respect to, for example, step 404 of process 400.

Process 500 may also include a step 508 of identifying quotes associated with the additional subject entities identified in, for example, step 506. Identifying quotes associated with the additional subject entities in step 508 of process 500 may include processes similar to those discussed with respect to, for example, step 406 of process 400.

Figure 6:
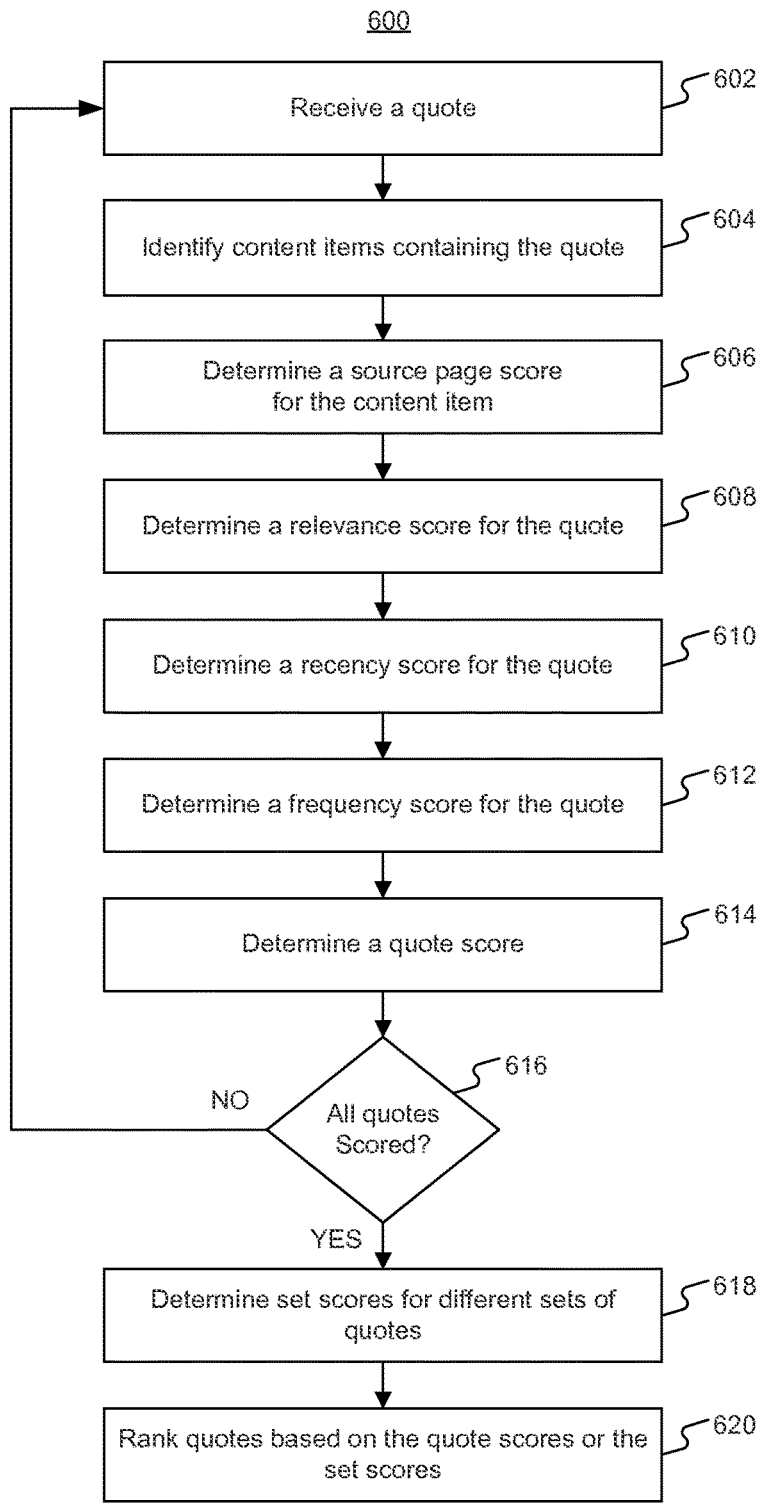
FIG. 6 is a flowchart of an exemplary process for assigning a score to quotes retrieved in response to a query.

FIG. 6 is a flowchart of an exemplary process 600, consistent with embodiments of the present disclosure. As further described below, the exemplary process 600 of FIG. 6 may be implemented for determining a quote score for a quote. Process 600 may be implemented with one or more processors. In certain embodiments, process 600 may be implemented on server 130 without the need to access client devices 102, 104 and/or network 120. In other embodiments, process 600 may be implemented on client devices 102, 104 without the need to access server 130 and/or network 120. In further embodiments, process 600 may be implemented using one or more of client devices 102, 104, and/or server 130 communicating via network 120. The order and arrangement of steps in process 600 is provided for purposes of illustration. As will be appreciated from this disclosure, modifications may be made to process 600 by, for example, adding, combining, removing, and/or rearranging the steps for the process.

As shown in FIG. 6, process 600 may include a step 602 of receiving a quote. In some embodiments, client device 102, 104 may receive the quote by performing processes as discussed above with respect to, for example, step 406 of process 400. In some embodiments, a quote identified by client devices 102, 104 may be received by server 130 or vice versa. In other embodiments, client devices 102, 104 or server 130 may store quotes identified using, for example, step 406 of process 400, in main memory 230, storage device 240, quotes database 140, content database 150, and/or any other database associated with system 100. Receiving a quote may involve accessing an identified quote from main memory 230, storage device 240, quotes database 140, content database 150, and/or any other database associated with system 100. Additionally or alternatively, receiving a quote in step 602 of process 600 may include processes similar to those described above with respect to, for example, step 302 of process 300.

Process 600 may also include a step 604 of identifying one or more content items containing the quote. Identifying content items may include accessing information associated with the quote from quotes database 140. By way of example, information identifying content items containing a quote may be stored in association with the quote in quotes database 140. In certain embodiments, the identifying information may include a link, for example, a URL indicating the location where the content item containing the quote may be located. For example, the URL may indicate a record or location in content database 150, which may store the content item containing the quote.

Process 600 may also include a step 606 of determining a source page score for the content item containing the quote. The source page score for the content item may be based on relevance of the content item, reputation or credibility of the author, publisher, or content item provider associated with the content item, and/or popularity of the content item, etc. A source page score based on the reputation or credibility may be determined by accessing the source page score from a database, which stores source page scores based on reputation or credibility in association with authors, publishers, or content item providers. The database of source page scores may be included in quotes database 140, in content database 150, and/or in another database associated with system 100.

Popularity of a content item or an author of the content item may be determined, for example, based on the popularity of the content item, the author, or a combination of the content item and the author in the corpus of content items. Popularity of the content item may also be determined, for example, based on the number of times users 112, 114 have accessed the content item or based on the number of times users 112, 114 have searched for the content item on the web. A higher source page score may be assigned when a content item and/or an author of the content item have a relatively high popularity. In certain embodiments, popularity of a content item may be determined, for example, in a manner similar to determining popularity of a subject entity as discussed above with respect to step 404 of process 400. By way of example, an article containing a quote by President Obama on the television series "Breaking Bad" may have a high source page score if it has been accessed by a large number of users 112, 114, for example, several thousand users compared to an article which may have been accessed only by 50 to a 100 users.

Process 600 may also include a step 608 of determining a relevance score for a quote. A relevance score for a quote may be based on whether the quote is responsive to a query. In some embodiments, responsiveness may be determined based on popularity of the quote, popularity of a content item containing the quote, popularity of an author of the quote, popularity of subject entities associated with the query, etc. Popularity of a quote, a content item, or an author of a quote or content item may be determined as described above, based on for example, the popularity of the quote, the content item, and/or the author in a corpus of content items or in user searches on the web. Popularity of a quote, a content item, or an author of a quote or content item may also be determined, for example, based on the frequency with which the quote, the content item, and/or the author appear with one or more of each other in the corpus of content items on in user searches on the web. In certain embodiments, a quote may receive a higher relevance score when the popularity of the quote, content items containing the quote, and/or authors of the quote or of the content items containing the quote is high. In other embodiments, a quote may receive a high relevance score when the popularity of the quote together with subject entities associated with the query in the corpus of content items or in user searches on the web is high. In yet other embodiments, the relevance score may be based on the relative scores of the subject identities identified in, for example, step 404 of process 400 and/or step 506 of process 500. By way of example, a quote describing how breaking something may be considered bad may receive a low relevance score as compared to a quote related to the television show "Breaking Bad" because of the high popularity of the television show "Breaking Bad." By way of another example, a quote regarding Nelson Mandela appearing with the subject entity President Obama may receive a higher frequency score because the quote may occur more frequently in a corpus of content items or in user searches as compared to a quote regarding Nelson Mandela appearing with a subject entity such as, "world leader." Further, in other embodiments, a relevance score may be determined based on whether the quote may be relevant to a particular user. For example, a relevance score may be determined by determining the popularity of the quote in a particular user's own profile or search history.

Process 600 may also include a step 610 of determining a recency score for a quote. A recency score may be based on the time elapsed between when the quote was authored and the time when the quote was identified as being associated with a query. In some embodiments, the time elapsed may be determined based on a current date, for example, the date of query and the date associated with the quote based on the information associated with the quote as obtained, for example, from quotes database 140. By way of example, a quote from the year 2014 may receive a higher recency score compared to a quote from the year 2012 in response to a query in the year 2014.

Process 600 may also include a step 612 of determining a frequency score associated with a quote. Determining the frequency score may include, for example, determining the number of times the quote may have been accessed by users 112, 114, the number of times the quote appeared in the corpus of content items, or the number of times the quote may have been identified in response to a query. By way of example, a quote may receive a higher frequency score if the quote has been accessed by more users 112, 113 compared to a quote, which may have been accessed by fewer users 112, 114.

Process 600 may include a step 614 of determining a quote score for the quote. A quote score may be based on one or more of the source page score, the relevance score, the recency score, the frequency score, and/or another score associated with the quote. In some embodiments, the quote score may be determined as a weighted sum or a weighted average of the source page score, the relevancy score, the recency score, the frequency score, and/or another score associated with the quote. In other embodiments, the quote score may be determined as a maximum, a minimum, of the source page score, the relevancy score, the recency score, the frequency score, and/or another score associated with the quote. Based on this disclosure, one of ordinary skill in the art will recognize that the quote score may be determined in many ways by utilizing any of numerous mathematical functions and/or mathematical models known in the art.

Process 600 may include a step 616 of determining whether a quote score has been determined for all the quotes identified, for example, using the processes discussed with respect to step 406 of process 400. When it is determined in step 616 that a quote score has not been determined for all identified quotes (Step 616: No), process 600 may return to step 602 to receive the next quote for scoring. When it is determined in step 616, however, that a quote score has been determined for all identified quotes (Step 616: Yes), process 600 may proceed to step 618 to determine set scores for different sets of quotes in certain embodiments. In other embodiments, when it is determined in step 616 that a quote score has been determined for all identified quotes (Step 616: Yes), process 600 may proceed to step 620.

In step 618, quotes may be grouped into sets based on a relationship between the quotes, a relationship between the subject entities identified, for example, using step 404 of process 400, and/or a relationship between authors of quotes. For example, quotes made by political figures, such as President Barack Obama or Hillary Clinton, regarding "Breaking Bad" may be grouped into one set of quotes, while quotes made by film personalities, such as Clint Eastwood or Robert De Nero, regarding "Breaking Bad" may be grouped into another set. A set score may be assigned to each set of quotes based on the quote scores included in each set. In certain embodiments, set scores may be determined based on the popularity of the authors associated with the quotes.

Process 600 may also include a step 620 of ranking the quotes in a rank order. In some embodiments, the quotes may be ranked based on the quote scores. In other embodiments, sets of quotes may be ranked based on the set scores determined, for example, using step 618 of process 600. Ranking the quotes in step 620 of process 600 may include processes similar to those discussed with respect to, for example, step 410 of process 400.

Figure 7:
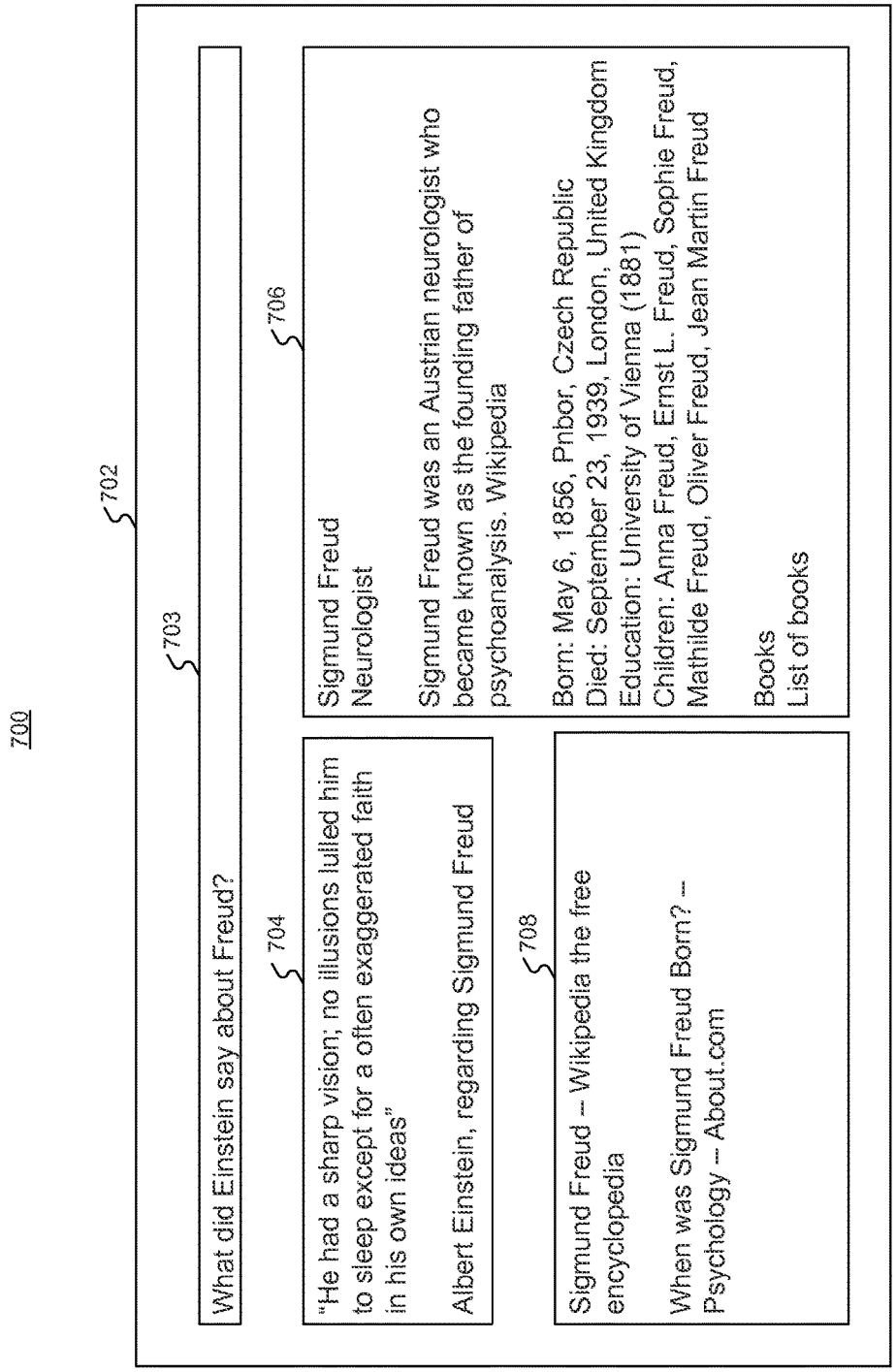
FIG. 7 illustrates an exemplary user interface for presenting the quotes retrieved in response to a query.

FIG. 7 illustrates an exemplary user interface 700. User interface 700 may present one or more quotes on display device 250 in response to a query for quotes, for example. As illustrated in FIG. 7, user interface 700 may include a display window 702. As further illustrated in FIG. 7, display window 702 may include a display portion 703 for displaying the query for quotes. For example, as shown in FIG. 7, display portion 703 displays the query "What did Einstein say about Freud?"

As also illustrated in FIG. 7, display window 702 may include a display portion 704 for displaying one or more quotes identified in response to a query. As illustrated in FIG. 7, display portion 704 may include the text of the quote within quotation marks. For example, as shown in FIG. 7, display portion 704 displays the quote "He had a sharp vision; no illusions lulled him to sleep except for an often exaggerated faith in his own ideas." Display portion 704 may also include the author of the quote and additional information such as a subject entity associated with the quote. For example, as shown in FIG. 7, display portion 704 displays the author and subject entity as "Albert Einstein, regarding Sigmund Freud" indicating "Albert Einstein" as the author and "Sigmund Freud" as the subject entity associated with the quote. Although display portion 704 displays only one quote in FIG. 7, display portion 704 may display more than one quote and the associated author and subject entity for each displayed quote. In certain embodiments, display portion 704 of window 702 may initially display only one or two quotes and may include a scroll bar to allow users 112, 114 to scroll the text to see additional quotes, authors, and/or subject entities not initially displayed in display portion 704.

Window 702 may additionally or alternatively include a display portion 706 for displaying a knowledge panel regarding a subject entity. A knowledge panel for a subject entity may include additional information regarding a subject entity, which may be obtained, for example, from a knowledge graph item associated with the subject entity. In certain embodiments, the one or more items of information displayed in the knowledge panel in display portion 706 may include a hyperlink, URL, etc. to additional content items associated with the one or more items of information. In certain embodiments, display portion 706 may also include one or more digital images depicting or associated with the subject entity. By way of example, as illustrated in FIG. 7, display portion 706 displays additional information regarding the subject entity "Sigmund Freud" associated with the quote displayed in display portion 704. The additional information displayed in display portion 706 may include a brief description of the subject entity, date of birth, date of death, family relationships, books, articles, etc. published by or related to the subject entity etc. For example, as illustrated in FIG. 7, the brief description in display portion 706 states: "Sigmund Freud was an Austrian neurologist who became known as the founding father of psychoanalysis." Display portion 706 also provides information regarding the source of the brief description by indicating "Wikipedia" as the source. Additionally, display portion 706, for example, displays the date and place of birth, date and place of death, and a list of children of the subject entity "Sigmund Freud." As also displayed in FIG. 7, display portion 706 provides a list of books written by "Sigmund Freud." Although not visible in FIG. 7, any of the items of information displayed in display portion 706 may be linked via a hyperlink, URL, etc. to additional content items related to the subject entity being displayed in display portion 706.

Window 702 may additionally or alternatively include a display portion 708 for displaying one or more additional content items related to the subject entity displayed, for example, in display portions 704, 706. The additional content items displayed in display portion 708 may be obtained, for example, from a knowledge graph item associated with the subject entity. Additionally or alternatively, the additional content items may be obtained by performing a search for content items associated with one or more subject entities associated with the query. The search for content items may be performed on a corpus of content items stored in content database 150, in any other database associated with system 100, or by using methods of searching content items known in the art. In certain embodiments, the one or more content items displayed in display portion 708 may be linked via a hyperlink, URL, etc. to additional content items associated with the one or more items of information displayed in display portion 708. For example, as illustrated in FIG. 7, display portion 708 displays links to two content items: (1) a link to a Wikipedia page about the subject entity "Sigmund Freud" and (2) a link to a content item on the website "about.com" titled "When was Sigmund Freud born?" Although display portion 708 as illustrated in FIG. 7 shows only two content items, any number of content items related to one or more subject entities associated with the query may be displayed in display portion 708. In certain embodiments, only one or two content items may be initially displayed in display portion 708 of window 702 and display portion 708 may include a scroll bar to allow users 112, 114 to scroll the text to see additional content items not initially displayed in display portion 708.

As illustrated in FIG. 7, in certain embodiments, display portion 704 may be located at the top left corner of display window 702, display portion 708 may be located below display portion 704, and display portion 706 may be located on the right side of display portions 704, 708. Although FIG. 7 illustrates a particular arrangement of display portions 704, 706, and 708 in display window 702, display portions 704, 706, and 708 may be arranged in any manner in display window 702.

Figure 8:
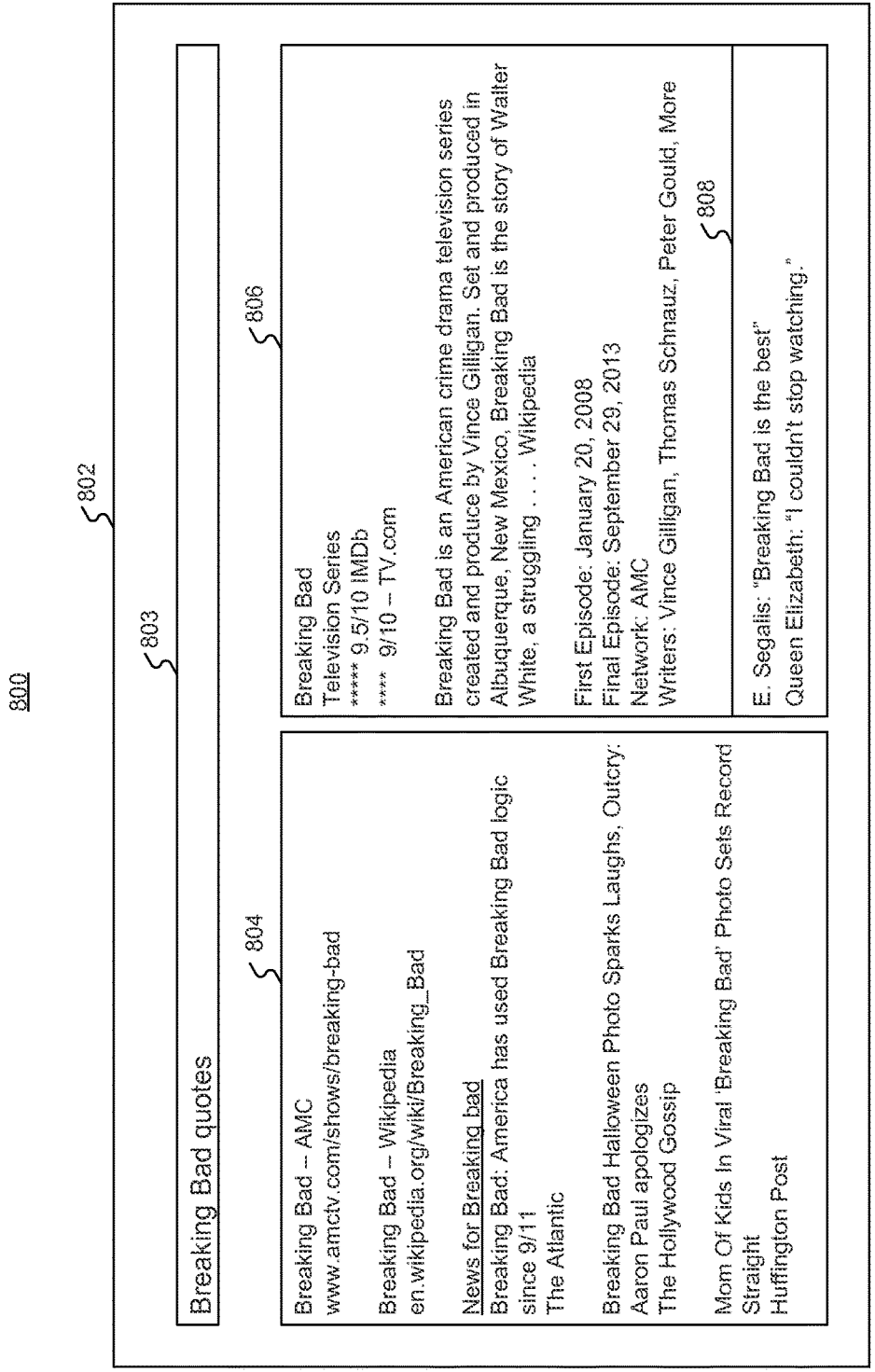
FIG. 8 illustrates another exemplary user interface for presenting the quotes retrieved in response to a query.

FIG. 8 illustrates another exemplary user interface 800. User interface 800 may present one or more quotes on display device 250 in response to a query for quotes, for example. By way of example, user interface 800 may present the one or more quotes in response to a query for quotes regarding a particular subject entity. As illustrated in FIG. 8, user interface 800 may include a display window 802. As further illustrated in FIG. 8, display window 802 may include a display portion 803 for displaying the query for quotes. For example, as shown in FIG. 8, display portion 803 displays the query "Breaking Bad quotes."

As also illustrated in FIG. 8, display window 802 may include a display portion 804 for displaying a knowledge panel regarding the subject entity. The information displayed in display portion 804 may be obtained, for example, from a knowledge graph item associated with the subject entity. In certain embodiments, the one or more items of information displayed in display portion 804 may be linked via a hyperlink, URL, etc. to additional content items associated with the one or more items of information. By way of example, as illustrated in FIG. 8, display portion 804 displays additional information regarding the subject entity "Breaking Bad." For example, the additional information displayed in display portion 804 may include links to a number of content items. In the example illustrated in FIG. 8, display portion 804 includes a link to a web site represented by the hyperlink www.amctv.com/shows/breaking-bad. Display portion 804, as illustrated in FIG. 8, also includes another link to en.wikipedia.org/wiki/Breaking_Bad, which is a web page from Wikipedia regarding the television series "Breaking Bad." Display portion 804 may include additional links to content items, for example, news items related to the subject entity. In the example illustrated in FIG. 8, display portion 804 includes links to several news items from the web sites of "The Atlantic," "Huffington Post," and "The Hollywood Gossip." In certain embodiments, only one or two content items may be initially displayed in display portion 804 of window 802 and display portion 804 may include a scroll bar to allow users 112, 114 to scroll the text to see additional content items not initially displayed in display portion 804.

Window 802 may additionally or alternatively include a display portion 806 for displaying additional information regarding the subject entity. The information displayed in display portion 806 may be obtained, for example, from a knowledge graph item associated with the subject entity. In certain embodiments, the one or more items of information displayed in display portion 806 may be linked via a hyperlink, URL, etc. to additional content items associated with the one or more items of information. In certain embodiments, display portion 806 may also include one or more digital images depicting or associated with the subject entity. By way of example, as illustrated in FIG. 8, display portion 806 displays additional information regarding the subject entity, for example television series, "Breaking Bad." The additional information displayed in display portion 804 may include, for example, a brief description of the television series, rating information, the dates of the first and last episodes, and a list of writers associated with the television series "Breaking Bad." For example, as illustrated in FIG. 8, the brief description in display portion 806 states: "Breaking Bad is an American crime drama television series created and produce by Vince Gilligan. Set and produced in Albuquerque, N. Mex., Breaking Bad is the story of Walter White, a struggling . . . . " Display portion 806 also exemplarily provides rating information of 5 stars (9.5/10) from "iMDb.com" and 4 stars (9/10) from "TV.com." Additionally, display portion 806, for example, displays "Vince Gilligan, Thomas Schnauz, Peter Gould" as some of the writers of the television series "Breaking Bad." In certain embodiments, only one or two items of additional information may be initially displayed in display portion 806 of window 802 and display portion 806 may include a scroll bar to allow users 112, 114 to scroll the text to see additional content items not initially displayed in display portion 806.

Display portion 806, additionally or alternatively, also includes display portion 808 for displaying one or more quotes associated with the subject entity identified in the query. For example, as illustrated in FIG. 8, display portion 808 may include the text of one or more quote within quotation marks. Display portion 808 may also list the author of each of the quotes. For example, as shown in FIG. 8, display portion 808 displays the quote "Breaking Bad is the best" alongside the author of the quote "E. Segalis."

Similarly, for example, as shown in FIG. 8, display portion 808 displays the quote "I could not stop watching it" alongside the author of the quote "Queen Elizabeth." Although display portion 808 displays only two quotes in FIG. 8, display portion 808 may display any number of quotes and the associated authors. In certain embodiments, display portion 808 may initially display only one or two quotes and display portion 808 may include a scroll bar to allow users 112, 114 to scroll the text to see additional quotes not initially displayed in display portion 808. Although FIG. 8 illustrates a particular arrangement of display portions 804, 806, and 808 in display window 802, display portions 804, 806, and 808 may be arranged in any manner in display window 802.

Other embodiments of the disclosure will be apparent to those skilled in the art from consideration of the specification and practice of the embodiments disclosed herein. It is intended that the specification and examples be considered as exemplary only, with a true scope and spirit of the invention and exemplary embodiments being indicated by the following claims.

What is claimed is:

1. A computerized system for searching and identifying quotes, the system comprising:
    a memory device that stores a set of instructions; and
    at least one processor that executes the set of instructions to:
    receive a search query for a quote from a user;
    parse the query to identify one or more key words;
    match the one or more key words to knowledge graph items associated with candidate subject entities in a knowledge graph stored in one or more databases, wherein the knowledge graph includes a plurality of items associated with a plurality of subject entities and a plurality of relationships between the plurality of items;
    determine, based on the matching knowledge graph items, a relevance score for each of the candidate subject entities;
    identify, from the candidate subject entities, one or more subject entities for the query based on the relevance scores associated with the candidate subject entities;
    identify a set of quotes corresponding to the one or more subject entities;
    determine quote scores for the identified quotes based on at least one of the relationship of each quote to the one or more subject entities, the recency of each quote, or the popularity of each quote;
    select quotes from the identified quotes based on the quote scores; and
    transmit information to a display device to display the selected quotes to the user.

2. The computerized system of claim 1, wherein the instructions cause the at least one processor to select quotes by:
    organizing the identified quotes in a rank order based on the quote scores; and
    selecting quotes from the identified quotes based on the rank order.

3. The computerized system of claim 1, wherein the instructions further cause the at least one processor to:
    select a first subject entity from the one or more subject entities; and
    identify additional subject entities associated with the first subject entity based on a knowledge graph item associated with the first subject entity.

4. The computerized system of claim 3, wherein the set of quotes is a first set of quotes and the instructions further cause the at least one processor to:
  identify, from a database of quotes, a second set of quotes corresponding to the additional subject entities.

5. The computerized system of claim 4, wherein the instructions further cause the at least one processor to:
  select a first quote from the first set of quotes and the second set of quotes;
  identify a date associated with the first quote;
  determine an elapsed time from the date to a current date; and
  determine a recency score based on the elapsed time.

6. The computerized system of claim 5, wherein the instructions further cause the at least one processor to:
  retrieve first content items related to the query from a content database;
  determine a number of times the first quote appeared in the first content items; and
  determine a frequency score for the first quote based on the number.

7. The computerized system of claim 6, wherein the instructions further cause the one or more processors of the server to:
  determine a quote score based on at least one of the relevance score, the recency score, and the frequency score.

8. The computerized system of claim 6, wherein the instructions further cause the one or more processors of the client to:
  determine the quote score as a weighted combination of the relevance score, the recency score, and the frequency score.

9. The computerized system of claim 7, wherein the instructions further cause the one or more processors of the client to:
  determine quote scores for all quotes in the first and second set of quotes; and rank the quotes in the rank order based on the quote scores.

10. The computerized system of claim 9, wherein the instructions further cause the one or more processors of the client to:
  select at least one quote from the quotes in the rank order; and
  identify, from the content database, second content items corresponding to a second subject entity associated with the at least one quote.

11. The computerized system of claim 9, wherein the instructions further cause the at least one processor to:
  display a window on the display device;
  display the at least one quote in a first display portion of the window;
  display the second content items in a second display portion of the window; and
  display a knowledge panel associated with the second subject entity in a third display portion of the window.

12. The computerized system of claim 11, wherein the instructions further cause the at least one processor to:
  display the first display portion nearer a top left corner of the window;
  display the second display portion below the first display portion; and
  display the third display portion such that the first display portion and the second display portion are located adjacent the third display portion.

13. The computerized system according to claim 1, wherein each relevance score indicates a degree of relevance for a particular candidate subject entity, and further wherein the at least one processor executes the set of instructions to identify the one or more subject entities for the query based on the candidate subject entities having the highest relevance scores.

14. A computer-implemented method for searching and identifying quotes, the method comprising the following operations performed by one or more processors:
  receiving a search query for a quote from a user;
  parsing the query to identify one or more key words;
  matching the one or more key words to knowledge graph items associated with candidate subject entities in a knowledge graph stored in at least one database, wherein the knowledge graph includes a plurality of items associated with a plurality of subject entities and a plurality of relationships between the plurality of items;
  determining, based on the matching knowledge graph items, a relevance score for each of the candidate subject entities;
  identifying, from the candidate subject entities, one or more subject entities for the query based on the relevance scores associated with the candidate subject entities;
  identifying a set of quotes corresponding to the one or more subject entities;
  determining quote scores for the identified quotes based on at least one of the relationship of each quote to the one or more subject entities, the recency of each quote, or the popularity of each quote;
  selecting quotes from the identified quotes based on the quote scores; and
  transmitting information to a display device for displaying the selected quotes to the user.

15. The computer-implemented method of claim 14, wherein selecting quotes further includes:
  organizing the identified quotes in a rank order based on the quote scores; and
  selecting quotes from the identified quotes based on the rank order.

16. The computer-implemented method of claim 14, further including:
  selecting a first subject entity from the one or more subject entities; and
  identifying additional subject entities associated with the first subject entity based on a knowledge graph item associated with the first subject entity.

17. The computer-implemented method of claim 14, wherein the set of quotes is a first set of quotes and the method further includes:
  identifying, from a database of quotes, a second set of quotes corresponding to the additional subject entities.

18. The computer-implemented method of claim 17, further including:
  selecting a first quote from the first set of quotes and the second set of quotes;
  identifying a date associated with the first quote;
  determining an elapsed time from the date to a current date; and
  determining a recency score based on the elapsed time.

19. The computer-implemented method of claim 18, further including:
  retrieving first content items related to the query from a content database;
  determining, a number of times the first quote appeared in the first content items; and determining a frequency score for the first quote based on the number.

20. The computer-implemented method of claim 19, further including:
determining a quote score based on at least one of the relevance score, the recency score, and the frequency score.

21. The computer-implemented method of claim 20, further including:
selecting at least one quote from the quotes in the rank order; and
identifying, from the content database, second content items corresponding to a second subject entity associated with the at least one quote.

22. The computer-implemented method according to claim 14, wherein each relevance score indicates a degree of relevance for a particular candidate subject entity, and the method further identifying the one or more subject entities for the query based on the candidate subject entities having the highest relevance scores.

23. A computer program product comprising executable instructions tangibly embodied in a non-transitory computer-readable medium, which when executed by one or more processors, cause the one or more processors to:
receive a search query for a quote from a user;
parse the query to identify one or more key words;
match the one or more key words to knowledge graph items associated with candidate subject entities in a knowledge graph stored in one or more databases, wherein the knowledge graph includes a plurality of items associated with a plurality of subject entities and a plurality of relationships between the plurality of items;
determine, based on the matching knowledge graph items, a relevance score for each of the candidate subject entities;
identify, from the candidate subject entities, one or more subject entities for the query based on the relevance scores associated with the candidate subject entities;
identify a set of quotes corresponding to the one or more subject entities;
determine quote scores for the identified quotes based on at least one of the relationship of each quote to the one or more subject entities, the recency of each quote, or the popularity of each quote;
select quotes from the identified quotes based on quote scores; and
transmit information to a display device for displaying the selected quotes to the user.

24. A client device for providing quotes in response to a query from a user, the client device comprising:
a memory device that stores a set of instructions;
at least one processor that executes the set of instructions to:
receive the query;
parse the query to identify one or more key words;
match the one or more key words to knowledge graph items associated with candidate subject entities in a knowledge graph stored in one or more databases, wherein the knowledge graph includes a plurality of items associated with a plurality of subject entities and a plurality of relationships between the plurality of items;
determine, based on the matching knowledge graph items, a relevance score for each of the candidate subject entities;
identify a set of quotes corresponding to the one or more subject entities;
determine quote scores for the identified quotes based on at least one of the relationship of each quote to the one or more subject entities, the recency of each quote, or the popularity of each quote;
select quotes from the identified quotes based on the quote scores; and
transmit information to display the selected quotes; and
a display device to receive the transmitted information and display the selected quotes to the user.

* * * * *